United States Patent
Reich et al.

(10) Patent No.: US 9,773,037 B2
(45) Date of Patent: Sep. 26, 2017

(54) SYSTEM AND METHOD FOR UPDATING DATA IN CRM

(71) Applicant: Veeva Systems Inc., Pleasanton, CA (US)

(72) Inventors: Uri Reich, Hamden, CT (US); Pengfei Liu, San Ramon, CA (US); Arno Sosna, Pleasanton, CA (US); Povilas Petkevicius, Barcelona (ES); Edward Gee, Walnut Creek, CA (US); David Wright, Dublin, CA (US); Jay H Hartley, Dublin, CA (US); Sadhana Jain, Walnut Creek, CA (US); Abhay Pimprikar, Campbell, CA (US)

(73) Assignee: VEEVA SYSTEMS INC., Pleasanton, CA (US)

( * ) Notice: Subject to any disclaimer, the term of this patent is extended or adjusted under 35 U.S.C. 154(b) by 293 days.

(21) Appl. No.: 14/702,307

(22) Filed: May 1, 2015

(65) Prior Publication Data

US 2016/0321314 A1    Nov. 3, 2016

(51) Int. Cl.
G06F 17/00    (2006.01)
G06F 17/30    (2006.01)
G06Q 30/00    (2012.01)
G06F 3/0481    (2013.01)
G06F 17/24    (2006.01)
G06F 3/0484    (2013.01)

(52) U.S. Cl.
CPC ...... *G06F 17/30365* (2013.01); *G06F 3/0484* (2013.01); *G06F 3/04817* (2013.01); *G06F 17/24* (2013.01); *G06F 17/241* (2013.01); *G06F 17/30371* (2013.01); *G06Q 30/01* (2013.01)

(58) Field of Classification Search
CPC ......... G06F 17/30365; G06F 17/30371; G06F 17/30; G06F 17/30589
USPC .................................. 707/600–899
See application file for complete search history.

(56) References Cited

U.S. PATENT DOCUMENTS

2005/0114240 A1*  5/2005  Watson-Luke ......... G06Q 30/04
                                                  705/34

* cited by examiner

*Primary Examiner* — Isaac M Woo

(57) ABSTRACT

Systems and methods for processing user requests for updating data in a CRM system. When a user requests to update data in the CRM system, it is determined if the requested data change involves a DCR-controlled field. If yes, the requested data change may be routed to the MDM system for validation first and the data change may not be used to update the CRM until the validation is successful. If the requested data change does not involve any DCR-controlled field, it may update the CRM immediately.

20 Claims, 9 Drawing Sheets

SYSTEM AND METHOD FOR UPDATING DATA IN CRM

BACKGROUND

The subject technology relates generally to customer relationship management ("CRM"), and more particularly to enterprise data management, integration and synchronization.

In the pharmaceutical sales industry, sales representatives visit, call or send emails to doctors to communicate product information. Their company employers (e.g., pharmaceutical companies) often use a CRM system to manage the doctors' professional information. It is desirable to update the CRM system in time with correct data to make it more reliable for the sales representatives.

SUMMARY

The disclosed subject matter relates to a method for processing user requests for updating data in a customer relationship management ("CRM") system. The method comprising: displaying a first user interface for receiving user requests for updating data in the CRM system, wherein the first user interface comprises a first data input area and a second data input area, corresponding to a first data field and a second data field respectively; displaying a first icon for indicating that the first data field is a data change request ("DCR")-controlled field; receiving a first user request for a first data change in the first data field; generating a first data change request; and sending the first data change request to a master data management ("MDM") system to validate the first data change.

BRIEF DESCRIPTION OF THE DRAWINGS

FIGS. 6A and 6B each illustrates an example user interface for updating data in the CRM according to one embodiment of the present invention.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The subject technology is directed to techniques for managing, integrating and synchronizing data for an enterprise. A CRM system and a Master Data Management ("MDM") system may be used to hold and manage the enterprise's data. The CRM system may store customer account information for the enterprise. The MDM system may store customer master data for the enterprise, which may include data from an MDM provider. A data steward service may be used to maintain the customer master data in the MDM and make it accurate and up-to-date. Data in the CRM system may include those managed by the MDM system ("master data", e.g., account, address and child account) and those not ("non-master data"). When a user requests to update data in the CRM system, the present invention may determine if the requested data change involves any master data. If yes, the requested data change may be validated in the MDM system first and the data change may not be used to update the CRM until the validation is successful. If the requested data change does not involve any master data, it may update the CRM directly.

A data change request ("DCR") may be generated when a data change in the CRM system may involve master data. A DCR may be a separate and independent object, and may be used for all data changes including, e.g., new record creation, modification of existing record, and deletion of existing record. A DCR may be generated for each separate master data object (e.g., account, address or child account) that is created or edited. A DCR may also be generated for changes to two or more related objects, Each DCR may have one or more DCR lines. A DCR line may be generated for each data field change and may include a DCR line ID, and the data field's name, old value, new value, final value and validation result. The validation result may include accepting the requested data change, rejecting the requested data change, and partially accepting the requested data change. The final validation result may be populated after the data change is successfully validated in the MDM system.

Figure 1:
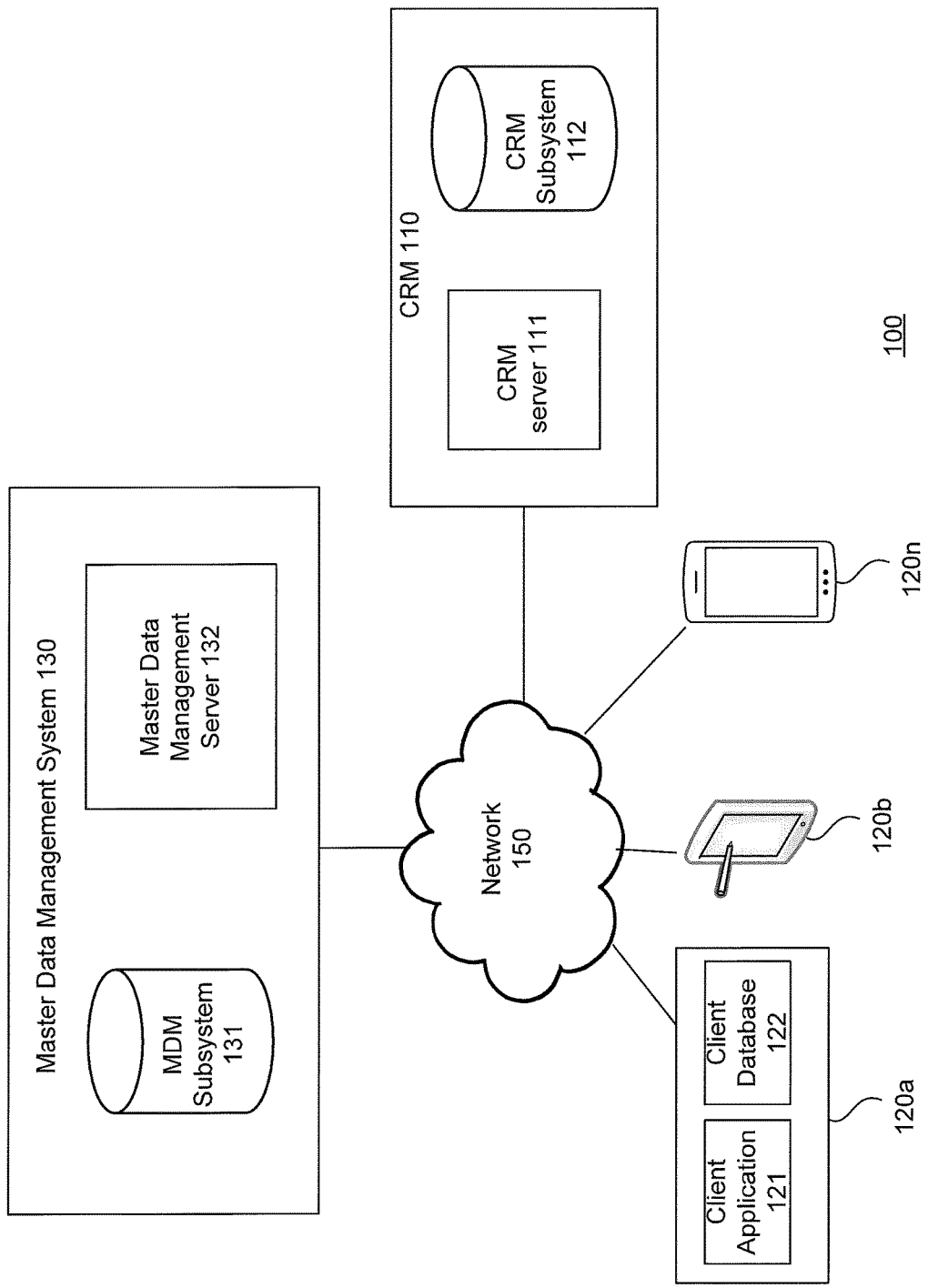
FIG. 1 illustrates an example high level block diagram of an enterprise data management architecture wherein the present invention may be implemented.

FIG. 1 illustrates an example high level block diagram of an enterprise data management architecture 100 wherein the present invention may be implemented. The enterprise may be a business, or an organization. As shown, the architecture 100 may include a CRM system 110, a plurality of user computing devices 120a, 120b, . . . 120n, and an MDM system 130, coupled to each other via a network 150. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the CRM 110 and the MDM 130 via the network 150, and may be any commercially available computing devices including laptop computers, desktop computers, mobile phones, smart phones, tablet computers, netbooks, and personal digital assistants (PDAs). A client application 121 may run from a user computing device, e.g., 120a, and access data in the MDM 130 and the CRM 110 via the network 150. A client database 122 for the client application 121 may store a subset of the customer's data in the CRM 110 which may be needed to support the operation of the client application 121.

The client database 122 may be synchronized with the CRM 110 regularly, when the user computing device is back online, and/or when the user requests for synchronization, while the CRM 110 may be updated with data from the master data management 130. Consequently, customers can access accurate, complete and up-to-date data. User computing devices 120a-120n are illustrated in more detail in FIG. 3.

The CRM 110 may have a CRM server 111 and a CRM subsystem 112. The CRM server 111 is typically a remote computer system accessible over a remote or local network, such as the network 150. The CRM server 111 could be any commercially available computing devices. A client application (e.g., 121) process may be active on one or more user computing devices 120a-120n, and the corresponding server process may be active on the CRM server 111. The client application process and the corresponding server process may communicate with each other and with the master data management 130 over the network 150, thus providing distributed functionality and allowing multiple client applications to take advantage of the information-gathering capabilities of the CRM 110 and the MDM 130. The CRM server 111 may control the method for processing data change requests, as will be described in detail below with reference to FIGS. 7A and 7B.

The CRM subsystem 112 may store data that client applications (e.g., 121) in user computing devices 120a-120n may use. In one embodiment, the CRM subsystem 112 may store data that pharmaceutical companies may need when promoting new products, which may include physician professional information (e g, name, specialty, license information, affiliated health care organization ("HCO"), contact information at the affiliated HCO, prior interaction record, electronic signature for samples, and medical inquiry submission), product information (e.g., name, category, lot and statistics), sales representative information (e.g., name, territory information, sharing rules and sales reports). It should be understood that the CRM subsystem 112 may store data for other industries.

In one implementation, data fields in the CRM subsystem 112 may be divided into three groups: DCR-controlled fields, DCR-enabled fields, and CRM-only fields. For a DCR-controlled field, a DCR is always generated and sent to the MDM 130 for validation, and no direct change may be made in the CRM 110 until the MDM 130 validates the data change. For a DCR-enabled field, a DCR is always generated and sent to the MDM 130, but the DCR is automatically accepted in the MDM 130 and immediate changes may be made to the CRM 110. For a CRM-only field, no DCR will be generated and immediate changes may be made to the CRM 110. The DCR-controlled fields may include, e.g., Last Name or Credential for Account, and Suite Number or City for Address. The DCR-enabled fields may include, e.g., Market Segmentation or Product Prescribing information on Account, Office Notes on Address and Primary on Child Account. All other fields may be CRM-only fields.

In one embodiment, the CRM 110 may be a multi-tenant system where various elements of hardware and software of the CRM 110 may be shared by one or more customers. For instance, a server may simultaneously process requests from a plurality of customers, and a database table may store rows for a plurality of customers. In a multi-tenant system, a user is typically associated with a particular customer. In one example, a user could be a sales representative of one of a number of pharmaceutical companies which are tenants, or customers, of the CRM 110.

In one embodiment, the CRM 110 may be a cloud database which runs on a cloud computing platform. Users can run databases on the cloud independently by using a virtual machine image, or purchasing access to a database service maintained by a cloud database provider.

The MDM 130 may include an MDM subsystem 131 and an MDM server 132. The MDM subsystem 131 may store customer master data which may be provided by an MDM provider. The customer master data may be many types of data which may be used by the enterprise, e.g., accounts, addresses and reference data. In one implementation, the MDM subsystem 131 may store verified healthcare provider ("HCP") and/or healthcare organization ("HCO") information for a pharmaceutical company, as the customer. In one example, the MDM subsystem 131 may store verified physician professional information of cardiologists in the U.S. compiled and/or purchased by a pharmaceutical company. Each HCP may be an account in the MDM subsystem 131. The MDM subsystem 131 may be implemented with any commercially available data storage devices. Master data (e.g., account, address and child account) managed by the MDM 130 may be stored in DCR-controlled fields in the CRM subsystem 112.

The master data management server 132 may be used to cleanse, standardize and/or de-duplicate data from different sources to form the single, consolidated customer master data and store the customer master data in the MDM subsystem 131. This may help the enterprise to avoid using multiple and potentially inconsistent versions of the same data. Any changes to the customer master data will be displayed on the data steward interface 1328 shown in FIG. 4, so that a data steward may check the changes and update the customer master data when the changes are verified. The master data management server 132 may further notify the CRM 110 about any updated accounts, so that the CRM 110 may be updated with the changes. The updates may then be synced down to the client database 122. The master data management server 132 may use any commercially available computing devices, and is illustrated in more detail in FIG. 4.

In one implementation, the MDM 130, including the customer master data in the MDM subsystem 131, may be provided to the customer by an MDM provider as a software as a service ("SaaS"). In addition, like the CRM 110, the MDM 130 may be a cloud based multi-tenant system.

In one implementation, a multi-channel processing engine may be used as an interface between the user computing devices 120a-120n, the CRM 110 and the MDM 130.

Figure 2:
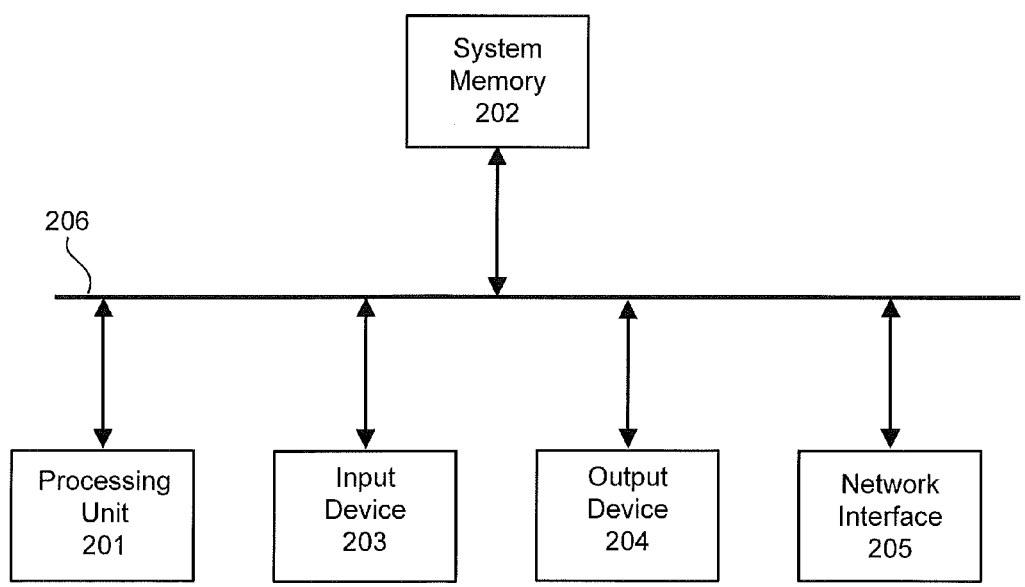
FIG. 2 illustrates an example high level block diagram of a computing device.

FIG. 2 illustrates an example high level block diagram of a computing device 200 which can be used as the user computing devices 120a-120n, the master data management server 132, and/or the CRM server 111 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
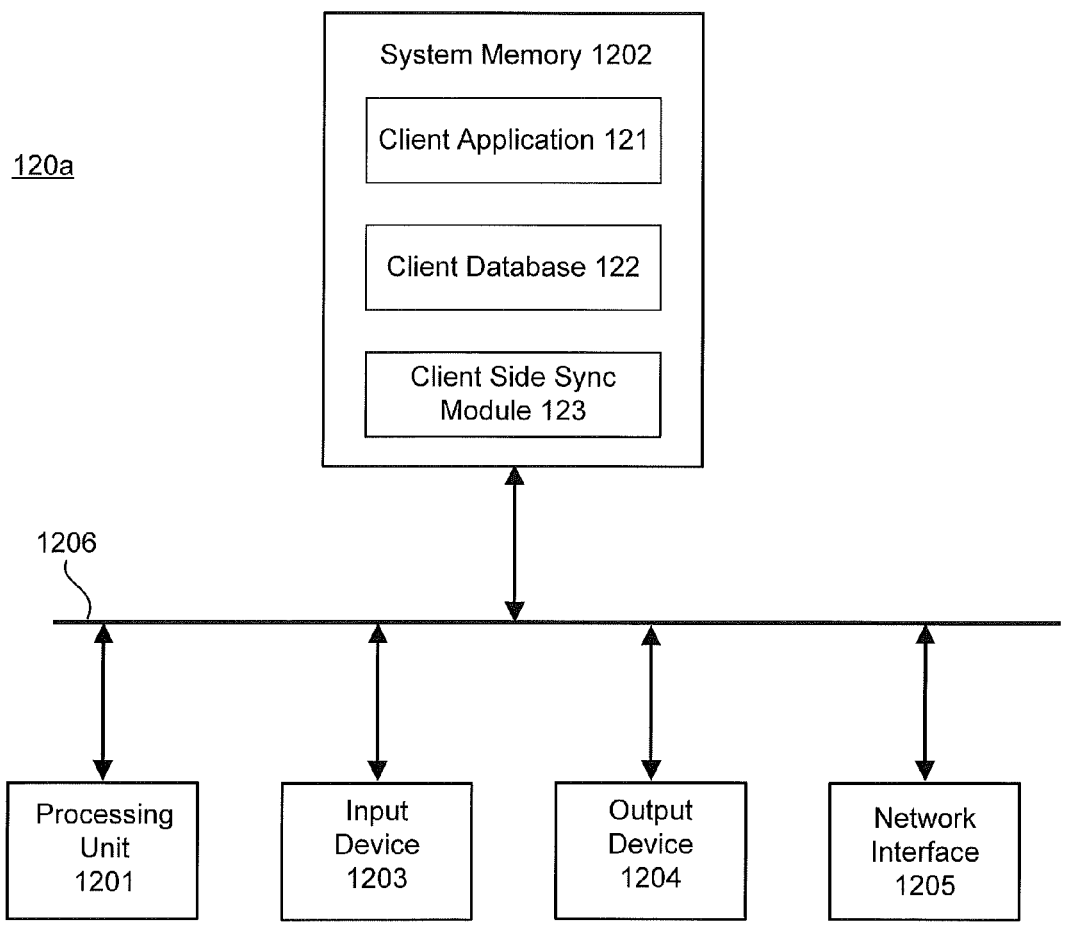
FIG. 3 illustrates an example high level block diagram of a user computing device.

FIG. 3 illustrates an example high level block diagram of a user computing device (e.g., 120a) wherein the present invention may be implemented. The user computing device 120a may be implemented by the computing device 200 described above, and may have a processing unit 1201, a system memory 1202, an input device 1203, an output device 1204, and a network interface 1205, coupled to each other via a system bus 1206. The client application 121 and the client database 122 may be stored in the system memory 1202. In one embodiment, the client database 122 may be maintained in a local store, e.g., a hard disk, relational store, cache memory, etc. The system memory 1202 may also store a client side sync module 123, which may coordinate with a server side process 1117 (shown in FIG. 5) in the CRM server 111 to facilitate data synchronization between the client database 122 and the CRM 110.

In one implementation, the client database 122 may store a subset of data from the CRM subsystem 112 which may be needed to support the operation of the client application 121. The data in the client database 122 may be associated with a specific user, and only data that the user is allowed to use when running the client application 121 on his/her user computing device 120a may be downloaded to the user computing device 120a during synchronization with the CRM 110.

Figure 4:
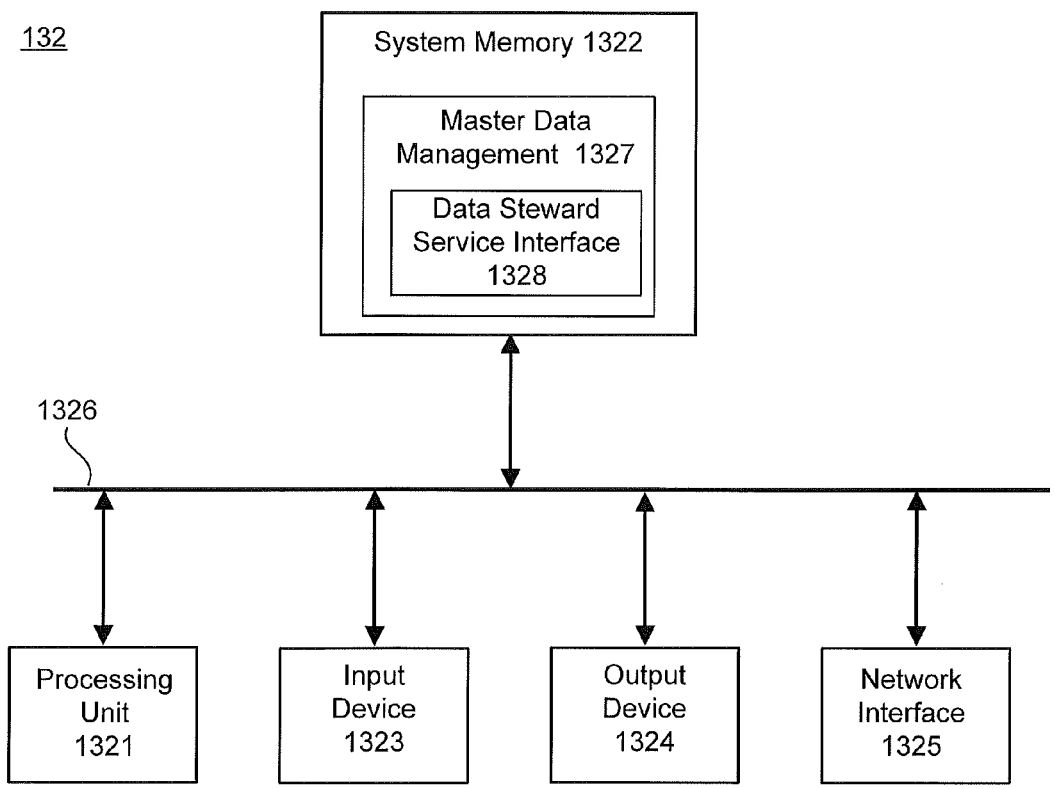
FIG. 4 illustrates an example high level block diagram of an MDM server according to one embodiment of the present invention.

FIG. 4 illustrates an example high level block diagram of the master data management server 132. The master data management server 132 may be implemented by the computing device 200, and may have a processing unit 1321, a system memory 1322, an input device 1323, an output device 1324, and a network interface 1325, coupled to each other via a system bus 1326. The system memory 1322 may store a master data management module 1327, which may be used to cleanse, standardize and de-duplicate HCP and/or HCO data from various sources to form the single, consolidated customer master data.

The master data management module 1327 may control a data steward service interface 1328, which may display records to be verified, merged or updated, receive updates to the customer master data, and store the updates to the MDM subsystem 131.

Figure 5:
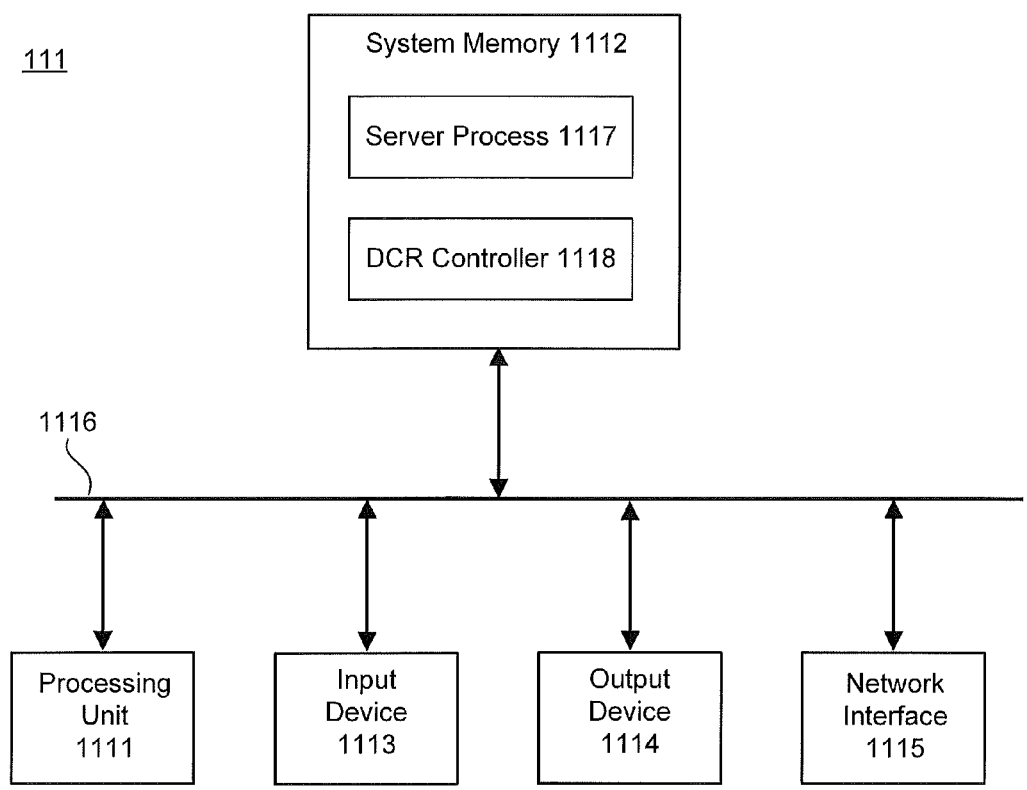
FIG. 5 illustrates an example high level block diagram of a CRM server according to one embodiment of the present invention.

FIG. 5 illustrates an example high level block diagram of the CRM server 111. The CRM server 111 may be implemented by the computing device 200, and may have a processing unit 1111, a system memory 1112, an input device 1113, an output device 1114, and a network interface 1115, coupled to each other via a system bus 1116. The system memory 1112 may store the server process 1117 corresponding to the client application 121 in user computing devices 120a-120n shown in FIG. 3. The system memory 1112 may also store a DCR controller 1118 which may process user requests for data change, as will be described in more detail below with reference to FIGS. 6A, 6B, 7A and 7B.

In one embodiment, the client application 121 is a sales tool for helping sales representatives (i.e., users) of pharmaceutical companies (i.e., customers) to promote products to physicians. Each of the pharmaceutical companies may store physician professional information it collected and/or purchased in the CRM 110, which may be a multi-tenant, cloud based CRM database system. Each pharmaceutical company may manage data availability to its sales representatives by territories, which could be a geographic area or a product. Each sales representative may access data in the CRM 110 of one of the pharmaceutical companies, specifically data for physicians in the territory he/she is assigned.

To enable a sales representative to use the client application 121 even when the user computing devices 120a-120n are disconnected and provide seamless transition between online and offline use, data relevant to a sales representative's use of the client application 121 may be stored in the client database 122. Such information may include, e.g., data related to the subset of physicians and/or products in his/her territory.

In order to provide a sales representative correct and newest information, and to share new information from a sales representative with other sales representatives in the same pharmaceutical company, client databases 122 on user computing devices 120a-120n and the CRM 110 need to be synchronized from time to time, which may be carried out by the client side sync module 123 and the server process 1117. The client database 122 and the CRM 110 may be synchronized regularly according to a preset schedule, in response to a user request, and/or when the user computing device 120a-120n is back online.

The pharmaceutical companies may also purchase service from an MDM provider to use the MDM 130, including the customer master data in the MDM subsystem 131. In one implementation, the MDM subsystem 131 may store address and license information of all physicians in a state, or all physicians with a specialty.

Figure 6A:
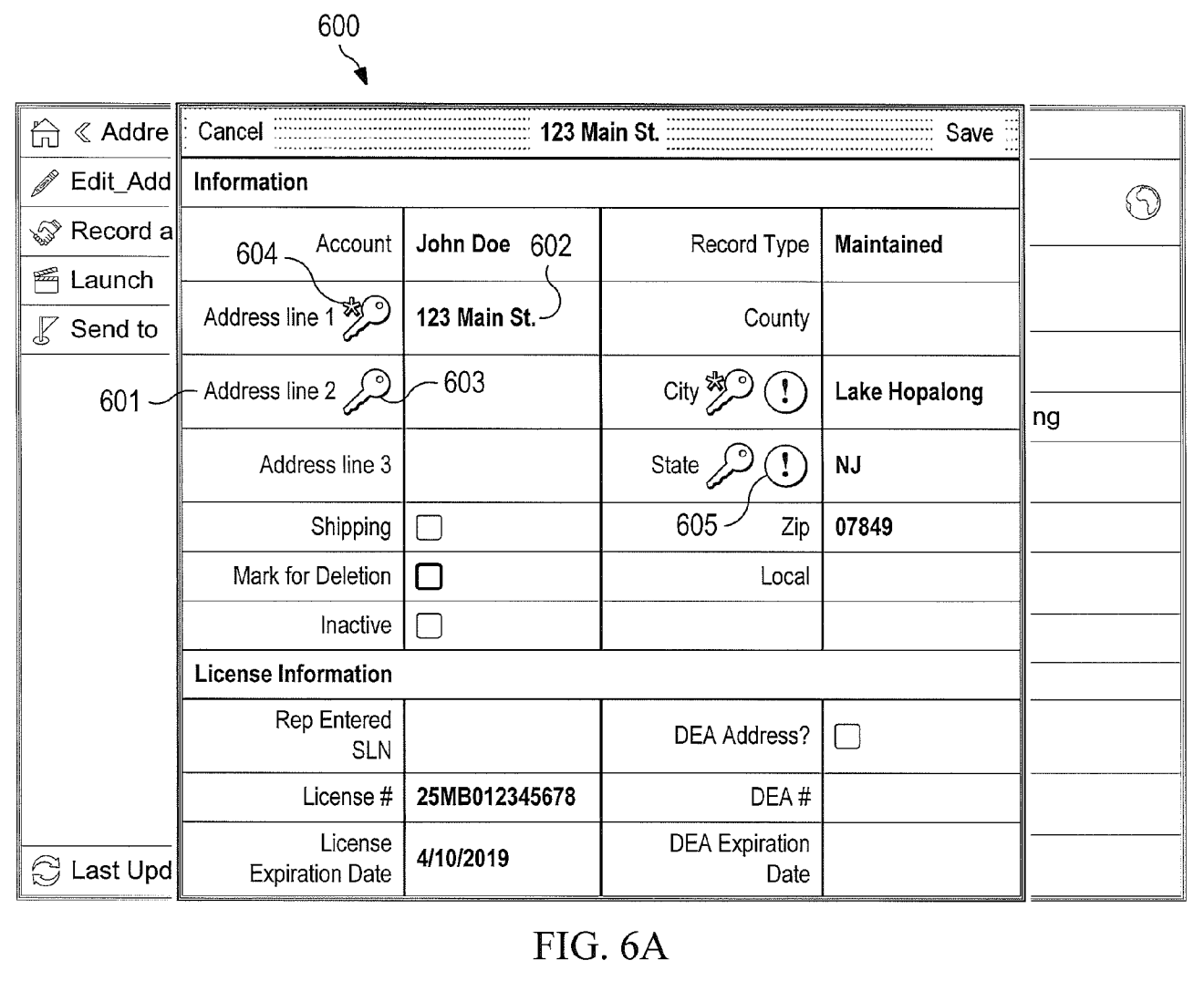

FIG. 6A illustrates an example user interface 600 for updating data in the CRM 110 according to one embodiment of the present invention. As shown, the user interface 600 may have a number of data input areas 602 for receiving user input for updating data in the CRM subsystem 112. Each data input area 602 may correspond to a data field in the CRM subsystem 112 and follow the data field's name 601. The data field may be, e.g., an account's name, address and license information. An icon 603 may be used to mark a DCR-controlled field, an icon 604 may be used to mark a required field, and an icon 605 may be used to indicate that a DCR is pending for the field.

Figure 6B:
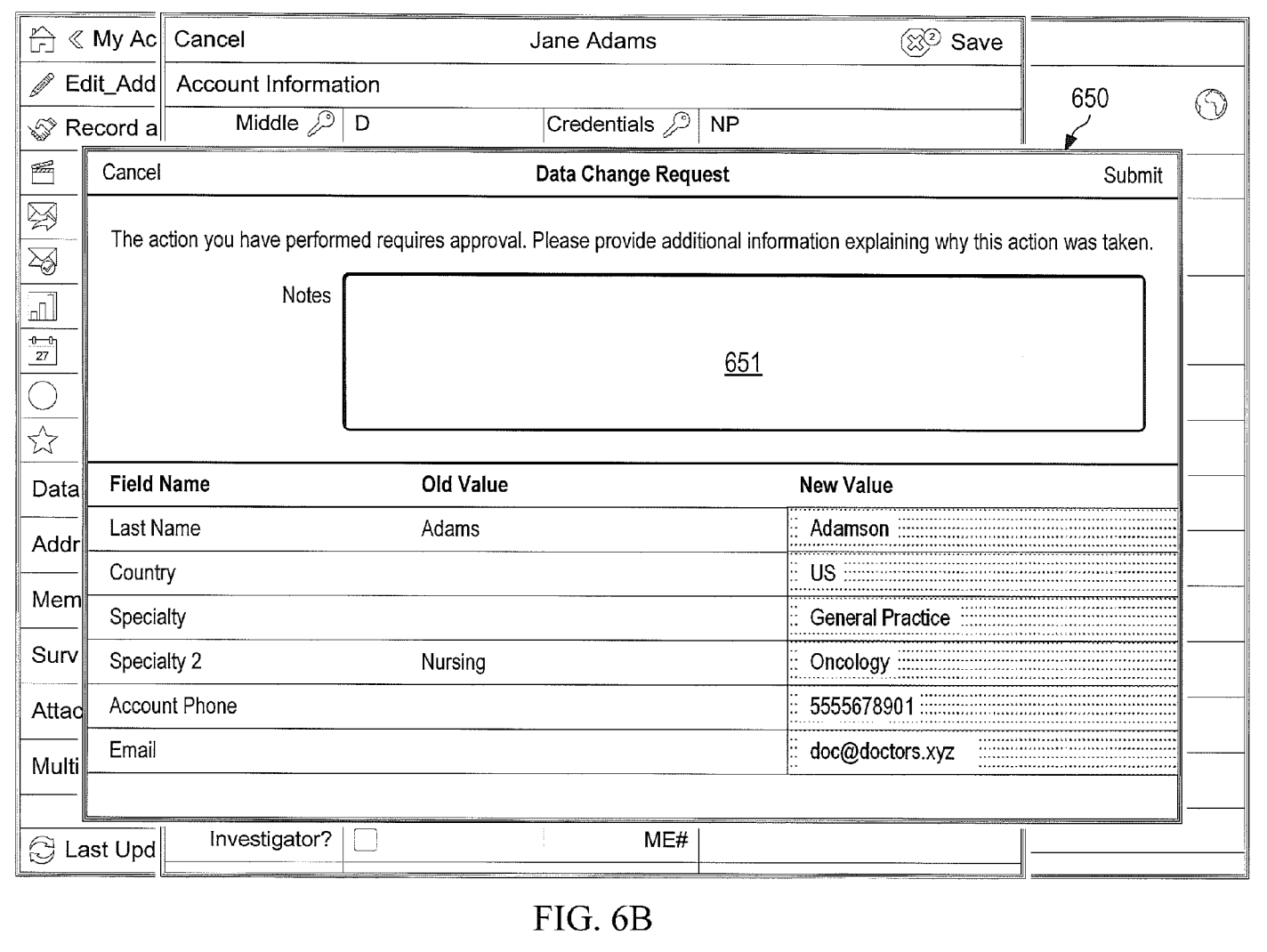

FIG. 6B illustrates an example user interface 650 for updating data in the CRM 110 according to one embodiment of the present invention. As shown, a window 651 may be displayed to ask the user to explain the reason for updating the data.

Figure 7A:
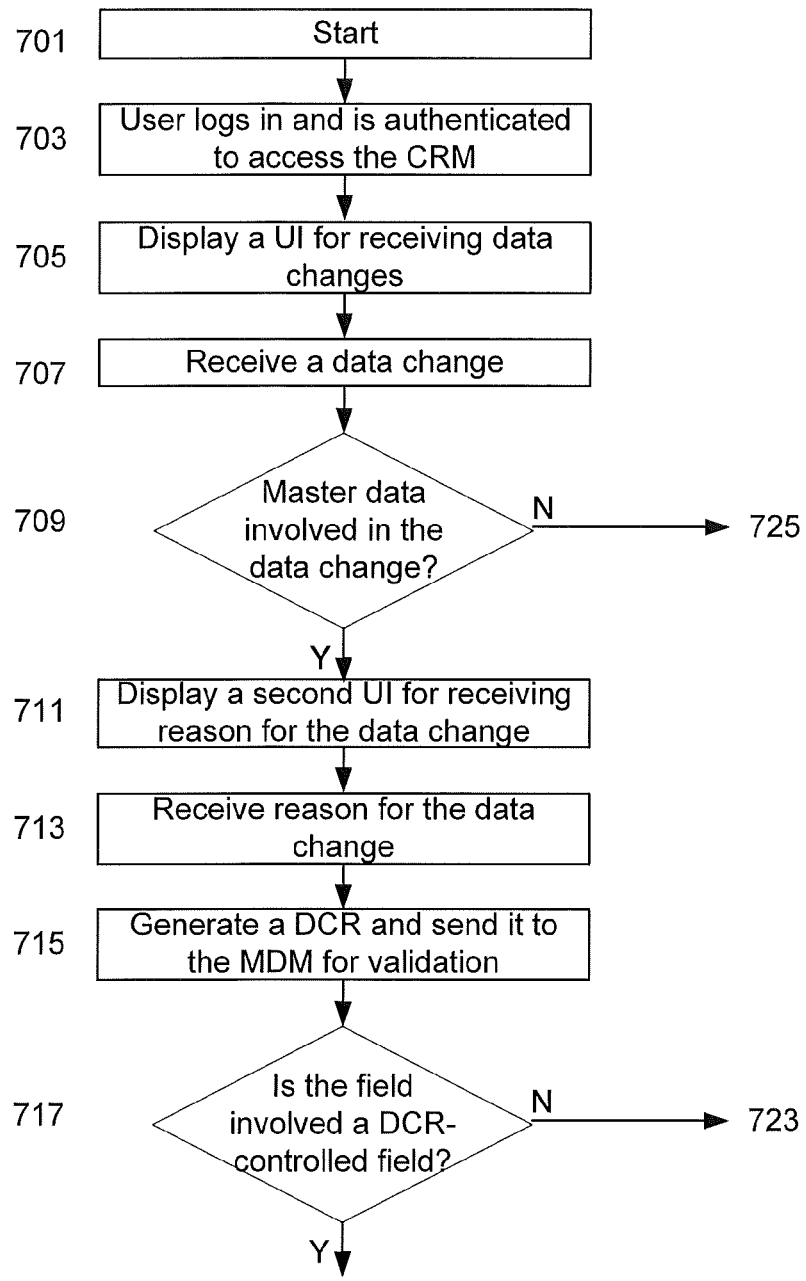
FIGS. 7A and 7B illustrate an example flowchart of a method for processing a user request for data change according to one embodiment of the present invention.
Figure 7B:
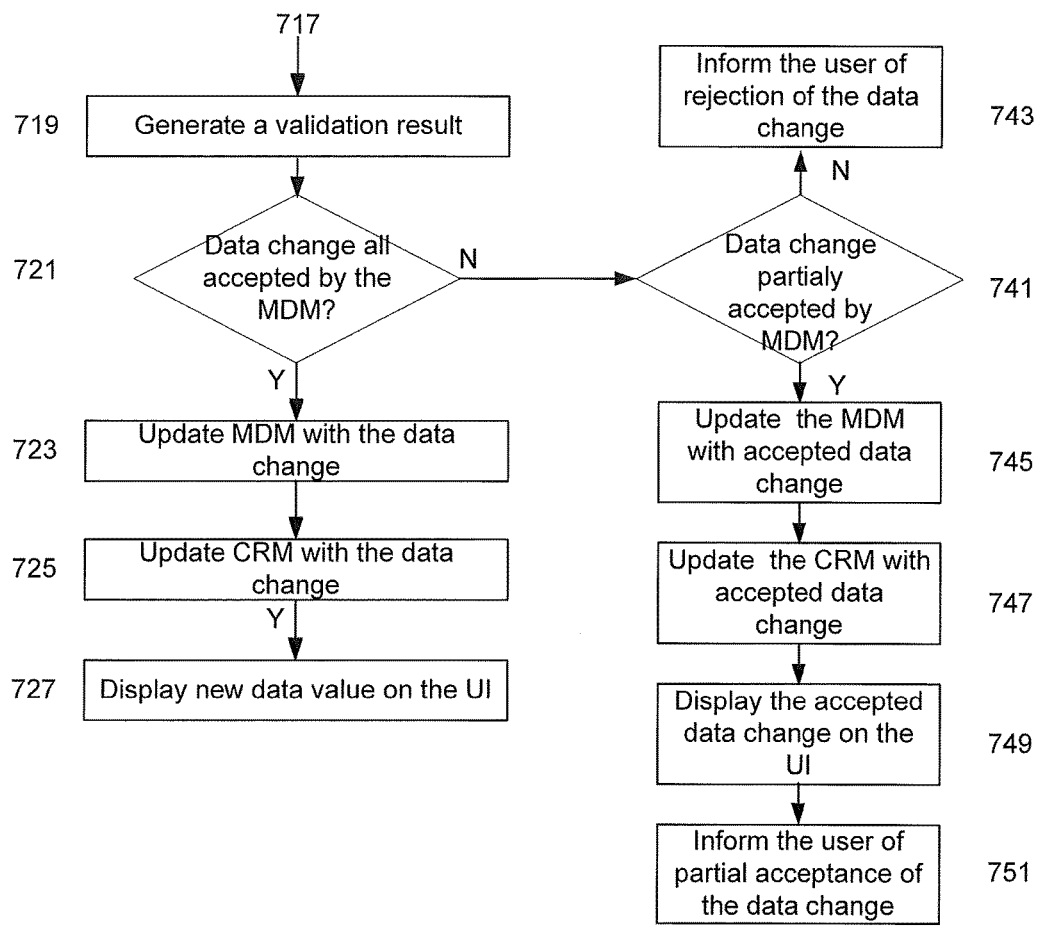

FIGS. 7A and 7B illustrate an example flowchart of a method for processing a user request for updating data in the CRM 110 according to one embodiment of the present invention. The process may start at 701.

At 703, a user may log in the client application 121 and be authenticated to access the CRM 110.

In response to a user request, a UI for receiving data changes to the CRM subsystem 112, e.g., the UI 600, may be displayed at 705.

At 707, a data change may be received. The data change may be new record creation, modification of existing record, and deletion of existing record. In one implementation, the data change may be received at the data input area 602 on the UI 600, and is for updating a doctor's address in the CRM 110.

At 709, it may be determined, e.g., by the DCR controller 1118, if the data change involves master data managed by the MDM 130. If not, the process may proceed to 725 to update the CRM 110 directly. The new data value may then be displayed on the UI 600 at 727.

If the data change involves master data managed by the MDM 130, at 711, the UI 650 may be displayed to ask the user the reason for the update.

At 713, the user's response may be received on the UI 650.

At 715, a DCR may be generated, e.g., by the DCR controller 1118. The DCR may be saved in the CRM 110, and sent to the MDM 130 for validation. For each object, e.g. Account, Address or Child Account, where a change is being requested, one DCR may be generated. Each DCR generated may contain one or more DCR lines. Each DCR line may represent a single field value change request, and may include the field's old value, new value, final value and validation result from the MDM 130. When an object has both DCR-controlled fields and DCR-enabled fields, the DCR can contain multiple DCR lines, some DCR controlled, some DCR enabled. A data steward of the MDM 130 may verify the changes.

At 717, it may be determined, e.g., by the master data management server 132, if the field involved is a DCR-controlled field. If not, the process may proceed to 723 to update the MDM 130 and the CRM 110.

If the field involved is a DCR-controlled field, at 719, a validation result may be generated by the MDM 130. Each DCR controlled-field can be individually accepted or rejected, or even modified by the data steward to a third value.

At 721, it may be determined if the data change is accepted by the MDM 130.

If the data change is accepted by the MDM 130, the MDM 130 may be updated with the data change at 723.

The result may be sent to the CRM 110 to update the data there at 725. In one implementation, the status of the DCR may be communicated to the CRM 110. The CRM 110 may "poll" for status changes, or the MDM 130 may push a notification of the change to the CRM 110. When the CRM 110 determines that the DCR status has changed, it may then retrieve and apply the changes within the CRM 110.

At 727, the new data value may be displayed on the UI 600. In one implementation, the status of the DCR may be updated, and final values may be recorded in the DCR lines, along side the original and requested values. The process may return to 707.

At 741, it may be determined, e.g., by the master data management server 132, if the data change is partially accepted. If not, the user may be informed of rejection of the data change at 743, e.g., via a third UI.

If the data change is partially accepted, the MDM 130 may be updated with the accepted data change at 745, the CRM 110 may be updated by the accepted data change at 747, new data value may be displayed on the UI 600 at 749, and the user may be informed of the validation result at 751, e.g., via a fourth UI.

The process may return to 707.

The process may include a retry mechanism in the event that sending a DCR to the MDM 130 fails, for example if the MDM 130 is temporarily offline or there are network communication problems. The DCRs may have a special status in the CRM 110 indicating they have not yet been received by the MDM 130. Such DCRs may be automatically re-sent on a scheduled basis, until the MDM 130 acknowledges receipt, at which point the DCR status is updated. This re-send mechanism may risk the possibility of duplicating the DCR in the MDM 130, in the case where the MDM 130 received the DCR the first time but the acknowledgement to the CRM 110 is lost, causing the CRM 110 to re-send the same request. To address this, each DCR may be given a unique identifier by the CRM 110, allowing the MDM 130 to detect re-sends and provide an appropriate re-acknowledgement to the CRM 110 without duplicating the DCR.

Thus, the present invention divides data fields into three groups: DCR-controlled fields, DCR-enabled fields, and CRM-only fields. For the DCR-controlled fields, since a DCR is generated and sent to the MDM 130 for validation for each data change and the data change will not be made to the CRM 110 and the MDM 130 until the validation is successful, the data in the CRM 110 and the MDM 130 is reliably maintained. For DCR-enabled fields, a DCR is generated and sent to the MDM 130, but data changes may be made to the CRM 110 and the MDM 130 almost in real time since validation is not necessary. For CRM-only data, no DCR is generated and changes may be made to the CRM almost in real time.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for processing user requests for updating data in a customer relationship management ("CRM") system, the method comprising:
    displaying a first user interface for receiving user requests for updating data in the CRM system, wherein the first user interface comprises a first data input area and a second data input area corresponding to a first data field and a second data field in the CRM system respectively, and wherein the CRM system stores customer account information comprising master data and non-master data, and wherein the master data is managed by a master data management ("MDM") system;
    displaying a first icon for indicating that the first data field is a data change request ("DCR")-controlled field when a data change to the CRM system involves the master data managed by the MDM system;
    receiving a first user request for a first data change in the first data field;
    generating a first data change request, wherein the first data change request comprises a first DCR line for the first data change; and
    sending the first data change request to the MDM system to validate the first data change.

2. The method of claim 1, wherein the first data change request is generated in response to an input on a second user interface, and wherein the second user interface asks for a reason for the first data change.

3. The method of claim 1, wherein the first DCR line comprises the first field's name, old value, and new value.

4. The method of claim 1, further comprising updating the MDM system with the first data change when the first data change is validated in the MDM system.

5. The method of claim 1, further comprising updating the first data field in the CRM system with the first data change when the first data change is validated in the MDM system.

6. The method of claim 1, further comprising: determining that the first data field is a DCR-controlled field.

7. The method of claim 1, wherein the first user request includes a second data change in the second data field, and wherein the second data field is a DCR-enabled field.

8. The method of claim 7, wherein the first data change request comprises a second DCR line for the second data change, and wherein the second DCR line is a DCR-enabled line.

9. The method of claim 7, further comprising updating the second data field in the CRM without validation.

10. The method of claim 7, further comprising automatically updating the MDM system with the second data change.

11. The method of claim 7, wherein the second data change request is processed as a background data change request without displaying it status.

12. The method of claim 1, further comprising displaying a second icon on the first user interface to indicate that the first data field is a required data field.

13. The method of claim 1, wherein the first user request comprises a request for new record creation.

14. The method of claim 1, wherein the first user request comprises a request for modification of an existing record.

15. The method of claim 1, wherein the first user request comprises a request for deletion of an existing record.

16. The method of claim 1, further comprising: displaying on the first user interface that the first data change request is pending before the first data change is validated by the MDM system.

17. The method of claim 1, further comprising determining that the first data change is partially accepted by the MDM system.

18. The method of claim 17, further comprising updating the CRM with the partially accepted data change.

19. A system for processing user requests for updating data in a customer relationship management ("CRM") system, the system comprising a DCR controller for:
   displaying a first user interface for receiving user requests for updating data in the CRM system, wherein the first user interface comprises a first data input area and a second data input area corresponding to a first data field and a second data field in the CRM system respectively, and wherein the CRM system stores customer account information comprising master data and non-master data, and wherein the master data is managed by a master data management ("MDM") system;
   displaying a first icon for indicating that the first data field is a data change request ("DCR")-controlled field when a data change to the CRM system involves the master data managed by the MDM system;
   receiving a first user request for a first data change in the first data field;
   determining that the first data change involves master data managed by the MDM system;
   generating a first data change request; and
   sending the first data change request to the MDM system to validate the first data change.

20. A non-transitory computer-readable medium for updating data in a customer relationship management ("CRM") system, the computer-readable medium comprising instructions that, when executed by a computer, cause the computer to:
   display a first user interface for receiving user requests for updating data in the CRM system, wherein the first user interface comprises a first data input area and a second data input area corresponding to a first data field and a second data field in the CRM system respectively, and wherein the CRM system stores customer account information comprising master data and non-master data, and wherein the master data is managed by a master data management ("MDM") system;
   display a first icon for indicating that the first data field is a data change request ("DCR")-controlled field when a data change to the CRM system involves the master data managed by the MDM system;
   receive a first user request for a first data change in the first data field;
   generate a first data change request; and
   send the first data change request to the MDM system to validate the first data change.

* * * * *